(12) United States Patent  (10) Patent No.: US 9,146,672 B2
Hicks  (45) Date of Patent: Sep. 29, 2015

(54) MULTIDIRECTIONAL SWIPE KEY FOR VIRTUAL KEYBOARD

(71) Applicant: barnesandnoble.com llc, New York, NY (US)

(72) Inventor: Kourtny M. Hicks, Sunnyvale, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 149 days.

(21) Appl. No.: 13/860,201

(22) Filed: Apr. 10, 2013

(65) Prior Publication Data

US 2014/0306899 A1    Oct. 16, 2014

(51) Int. Cl.
*G06F 3/0488*    (2013.01)

(52) U.S. Cl.
CPC ........ *G06F 3/04883* (2013.01); *G06F 3/04886* (2013.01); *G06F 2203/04808* (2013.01)

(58) Field of Classification Search
CPC ............ G06F 3/04886; G06F 3/04883; G06F 3/0237; G06F 2203/04808; G06F 3/0416; G06F 3/0488
USPC .......................... 345/173–179, 156, 168, 172; 178/18.01–18.09
See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |

(Continued)

FOREIGN PATENT DOCUMENTS

EP    0722150 A1    7/1996
WO    WO 2011/068004 A1 *    6/2011

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Lun-Yi Lao
*Assistant Examiner* — Md Saiful A Siddiqui
(74) *Attorney, Agent, or Firm* — Finch & Maloney PLLC

(57) ABSTRACT

Techniques are disclosed for providing a multidirectional swipe key for a virtual keyboard of a touch sensitive computing device. The multidirectional swipe key can be used to translate one or more swipe gestures started from the key into cursor movement (or directional input). The characteristics of the multidirectional swipe key gestures, such as the swipe direction and/or swipe length, may affect the resulting cursor movement (or directional input). The multidirectional swipe key may be configured such that held swipe gestures cause continual cursor movement (or directional input). The multidirectional swipe key may also be configured such that dragging the gesture to make a longer swipe accelerates cursor movement (or directional input) and vice versa.

18 Claims, 7 Drawing Sheets

(56) References Cited

U.S. PATENT DOCUMENTS

| | | | |
|---|---|---|---|
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0116421 | A1 | 8/2002 | Fox et al. |
| 2007/0047002 | A1 | 3/2007 | Hull et al. |
| 2008/0036747 | A1 | 2/2008 | Hope |
| 2009/0237371 | A1* | 9/2009 | Kim et al. .................. 345/173 |
| 2010/0100854 | A1 | 4/2010 | Russell et al. |
| 2010/0156813 | A1* | 6/2010 | Duarte et al. ............... 345/173 |
| 2010/0192086 | A1 | 7/2010 | Kocienda et al. |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1 | 12/2010 | Steinberger et al. |
| 2011/0258542 | A1 | 10/2011 | Kenney et al. |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0221938 | A1 | 8/2012 | Patterson et al. |
| 2012/0229410 | A1* | 9/2012 | Ohashi ...................... 345/173 |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0311438 | A1 | 12/2012 | Cranfill et al. |
| 2012/0329529 | A1 | 12/2012 | van der Raadt |
| 2013/0016045 | A1 | 1/2013 | Zhao et al. |
| 2013/0036383 | A1 | 2/2013 | Yuan et al. |
| 2013/0036388 | A1* | 2/2013 | Kirkpatrick .................. 715/856 |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0113699 | A1 | 5/2013 | Lim |
| 2013/0113720 | A1* | 5/2013 | Van Eerd et al. ............. 345/173 |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen The future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com, http://mobile.brando.com/prod_detail.php?prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flip-

(56) References Cited

OTHER PUBLICATIONS ping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=, 1 page, printed from the Internet on Jan. 15, 2013.

\* cited by examiner

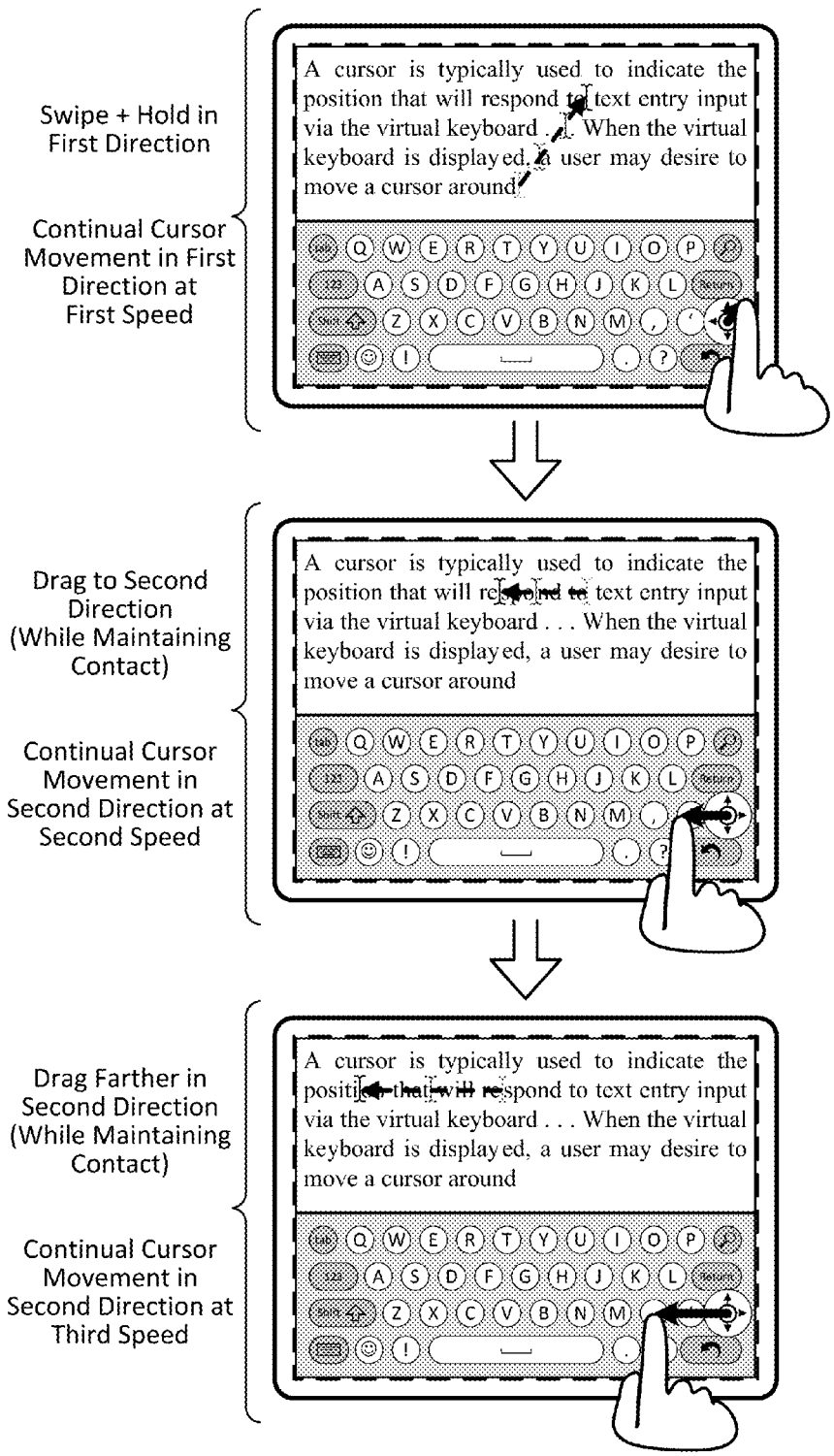

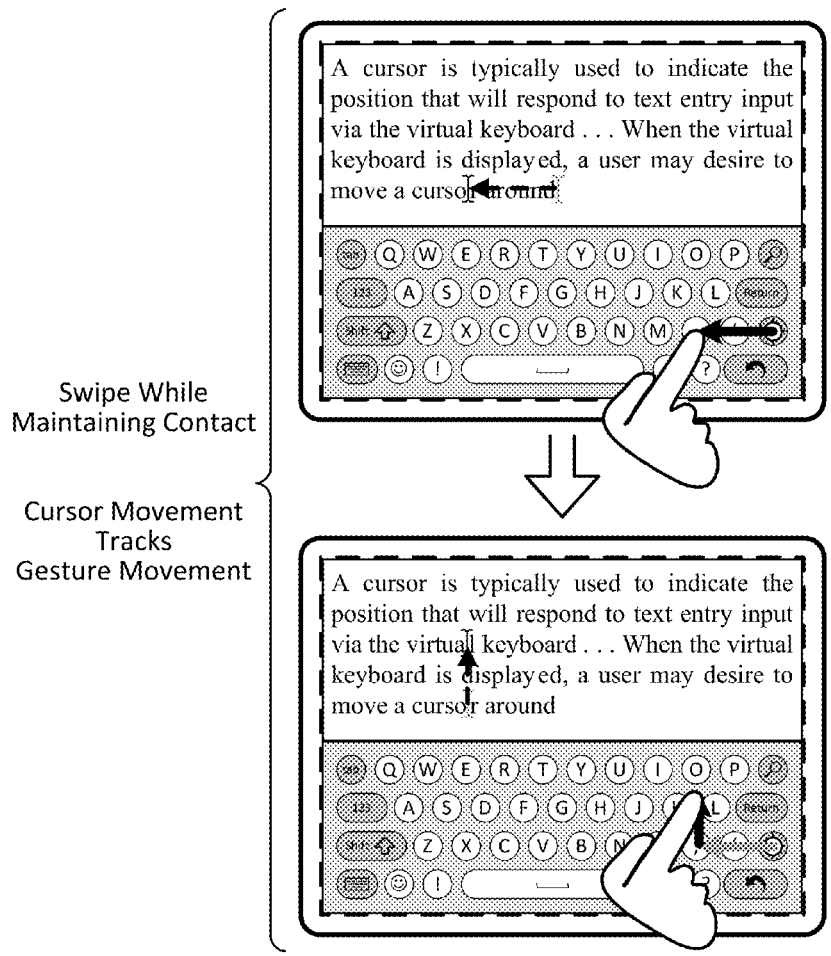
Fig. 3e
Fig. 3e'
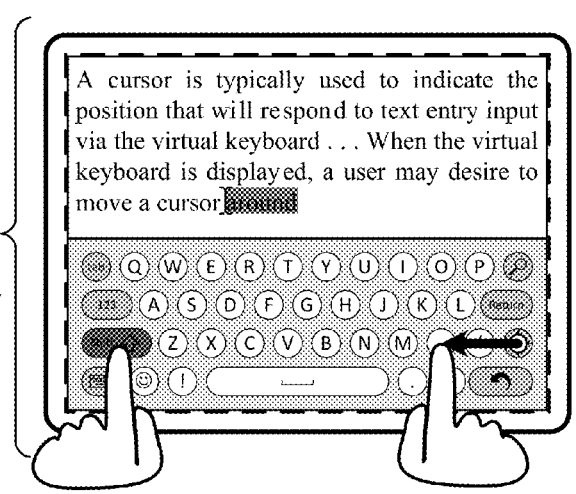
Fig. 3f

MULTIDIRECTIONAL SWIPE KEY FOR VIRTUAL KEYBOARD

FIELD OF THE DISCLOSURE

This disclosure relates to computing devices, and more particularly, to input techniques for touch sensitive devices.

BACKGROUND

Touch sensitive computing devices such as tablets, eReaders, mobile phones, smart phones, personal digital assistants (PDAs), and other such devices are commonly used for displaying consumable content. The content may be, for example, an eBook, an online article or website, images, documents, a movie or video, or a map, just to name a few types. Such devices are also useful for displaying a user interface that allows a user to interact with one or more applications or services running on the device. In some instances, the content is displayed and interacted with using a touch screen, while in other instances, the touch sensitive surface (such as a track pad) and display device (such as a non-touch sensitive monitor) may be separate. The user interface for these touch sensitive computing devices typically include a virtual keyboard (also referred to as a soft keyboard) for entering text and other characters. The virtual keyboard is typically displayed when a user is interacting with a text entry box or other various text input fields.

BRIEF DESCRIPTION OF THE DRAWINGS

FIGS. 3a-f illustrate gestures for directional input from a multidirectional swipe key of a virtual keyboard on a touch sensitive computing device, in accordance with one or more embodiments of the present invention.

DETAILED DESCRIPTION

Figure 1A:
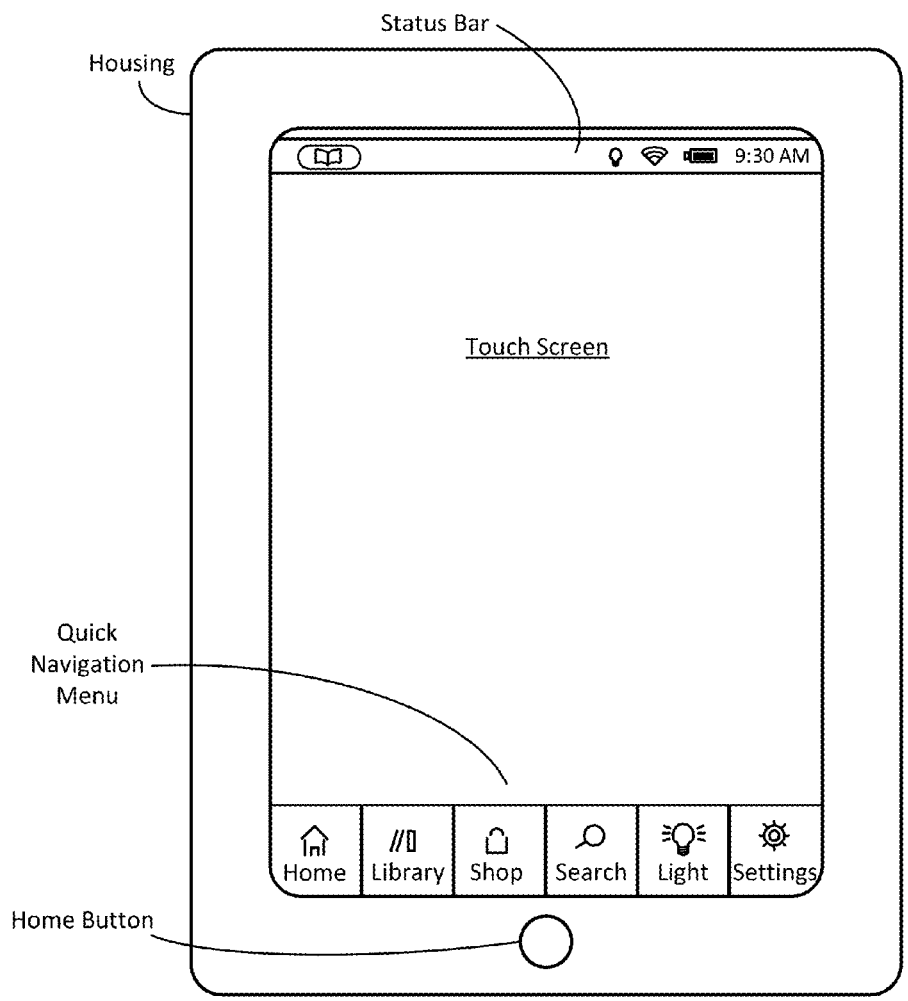
FIGS. 1a-b illustrate an example touch sensitive computing device having a virtual keyboard including a multidirectional swipe key configured in accordance with an embodiment of the present invention.
Figure 1B:
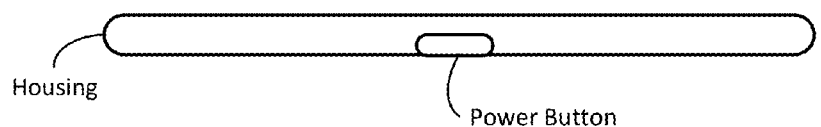

Techniques are disclosed for providing a multidirectional swipe key for a virtual keyboard of a touch sensitive computing device. The multidirectional swipe key can be used to translate one or more swipe gestures started from the key into cursor movement (or directional input). The characteristics of the multidirectional swipe key gestures, such as the swipe direction and/or swipe length, may affect the resulting cursor movement (or directional input). The multidirectional swipe key may be configured such that held swipe gestures cause continual cursor movement (or directional input). The multidirectional swipe key may also be configured such that dragging the gesture to make a longer swipe accelerates cursor movement (or directional input) and vice versa. Numerous other configurations and variations will be apparent in light of this disclosure.

General Overview

As previously explained, touch sensitive computing devices such as tablets, eReaders, and smart phones are commonly used for displaying user interfaces and consumable content. As was also explained, user interfaces for touch sensitive devices typically include a virtual keyboard for entering text and other characters into text boxes or other various text input fields. A cursor is typically used to indicate the position that will receive or otherwise respond to the key-based input via the virtual keyboard (also referred to as the insertion point). The cursor is typically displayed as a flashing or steady underscore, solid rectangle, or vertical line. When the virtual keyboard is displayed, a user may desire to move a cursor around (e.g., when a text input field is active) or provide other directional input, such as to move from cell to cell within a spreadsheet application. While most touch sensitive computing devices provide methods for moving a cursor, the methods typically require a user to tap to the desired cursor location or use unidirectional buttons to move the cursor. However, those and other known methods for cursor movement have drawbacks.

Thus, and in accordance with an embodiment of the present invention, techniques are disclosed for directional input using a multidirectional swipe key for the virtual keyboard of a touch sensitive computing device. As will be apparent in light of the present disclosure, the multidirectional swipe key is a single key that may be provisioned on any virtual keyboard to allow directional input in multiple or all directions. In this manner, the multidirectional swipe key may be used, for example, to move a cursor in an active text input field and/or be used to provide other directional input when there are no active text input fields and the virtual keyboard is still displayed. The directional input is provided using swipe gestures, where the direction of the swipe gesture can be used to determine the directional input, as will be apparent in light of this disclosure. Further, the techniques disclosed herein provide additional features that may enhance the directional input experience, particularly when dealing with touch sensitive devices that use a relatively small touch screen, such as smart phones, eReaders, and tablets. For ease of description, the directional input caused by swipe gestures using the multidirectional swipe key will be discussed with reference to causing cursor movement; however, the directional input from the multidirectional swipe key may have other applications, as will be apparent in light of this disclosure.

In some example cases, swipe gestures may be made from the multidirectional swipe key (i.e., where the starting contact point is on the key itself) to cause cursor movement in the direction of the swipe gesture. In other example cases, starting contact on the multidirectional swipe key (e.g., by starting a swipe gesture on the key or with an appropriately placed tap on the key or appropriate hover input) may cause a directional pad (D-pad) to pop-up, allowing a user to swipe on the directional pad to cause cursor movement relative to the center of the D-pad. The multidirectional swipe key may be configured in some embodiments to allow continual (or repeated) cursor movement by holding the swipe gesture. In some such embodiments, a user may be able to change the directional input by, for example, moving to a new location relative to the starting contact point made with the multidirectional swipe key or relative to the center of the multidirectional swipe key (or the center of the directional pad pop-up). In other embodiments, the cursor movement may track the movement of the swipe gesture, as will be discussed in turn. In some cases, the characteristics of the swipe gesture (e.g., the length and/or speed of the gesture) may affect the cursor movement (or directional input). For example, in some such cases, dragging a swipe gesture farther (or faster) from the center of the multidirectional swipe key may accelerate the cursor movement, and vice versa.

In some embodiments, the functions performed when using a multidirectional swipe key as variously described herein may be configured at a global level (i.e., based on the UI settings of the electronic device) and/or at an application level (i.e., based on the specific application being displayed). To this end, the multidirectional swipe key may be user-configurable in some cases, or hard-coded in other cases. Further, the multidirectional swipe key as described herein may be included with a virtual keyboard or be a separate program/service configured to interface with a pre-existing virtual keyboard to incorporate the functionality of the multidirectional swipe key as described herein (regardless of whether the virtual keyboard is UI based or application specific). For ease of reference, user input is sometimes referred to as contact or user contact; however, direct and/or proximate contact (e.g., hovering within a few centimeters of the touch sensitive surface) may be used to make the swipe gestures described herein depending on the specific touch sensitive device being used. In other words, in some embodiments, a user may be able to use the multidirectional swipe key without physically touching the touch sensitive device.

Device and Configuration Examples

FIGS. 1 a-b illustrate an example touch sensitive computing device having a virtual keyboard with a multidirectional swipe key configured in accordance with an embodiment of the present invention. The device could be, for example, a tablet such as the NOOK® Tablet by Barnes & Noble. In a more general sense, the device may be any electronic device having a touch sensitive user interface and capability for displaying content to a user, such as a mobile phone or mobile computing device such as an eReader, a tablet or laptop, a desktop computing system, a television, a smart display screen, or any other device having a touch screen display or a non-touch display screen that can be used in conjunction with a touch sensitive surface. As will be appreciated in light of this disclosure, the claimed invention is not intended to be limited to any particular kind or type of electronic device.

As can be seen with this example configuration, the device comprises a housing that includes a number of hardware features such as a power button and a press-button (sometimes called a home button herein). A touch screen based user interface (UI) is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI controls and features can be implemented using any suitable conventional or custom technology, as will be appreciated.

The power button can be used to turn the device on and off, and may be used in conjunction with a touch-based UI control feature that allows the user to confirm a given power transition action request (e.g., such as a slide bar or tap point graphic to turn power off). In this example configuration, the home button is a physical press-button that can be used as follows: when the device is awake and in use, tapping the button will display the quick navigation menu, which is a toolbar that provides quick access to various features of the device. The home button may also be configured to hide a displayed virtual keyboard. Numerous other configurations and variations will be apparent in light of this disclosure, and the claimed invention is not intended to be limited to any particular set of hardware buttons or features, or device form factor.

As can be further seen, the status bar may also include a book icon (upper left corner). In some such cases, the user can access a sub-menu that provides access to a multidirectional swipe key configuration sub-menu by tapping the book icon of the status bar. For example, upon receiving an indication that the user has touched the book icon, the device can then display the multidirectional swipe key configuration sub-menu shown in FIG. 1d. In other cases, tapping the book icon may just provide information on the content being consumed. Another example way for the user to access a multidirectional swipe key configuration sub-menu such as the one shown in FIG. 1d is to tap or otherwise touch the Settings option in the quick navigation menu, which causes the device to display the general sub-menu shown in FIG. 1c. From this general sub-menu the user can select any one of a number of options, including one designated Input in this specific example case. Selecting this sub-menu item (with, for example, an appropriately placed screen tap) may cause the multidirectional swipe key configuration sub-menu of FIG. 1d to be displayed, in accordance with an embodiment. In other example embodiments, selecting the Input option may present the user with a number of additional sub-options, one of which may include a so-called multidirectional swipe key option, which may then be selected by the user so as to cause the multidirectional swipe key configuration sub-menu of FIG. 1d to be displayed. Any number of such menu schemes and nested hierarchies can be used, as will be appreciated in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc.). Additional example details of the underlying OS and circuitry in accordance with some embodiments will be discussed in turn with reference to FIG. 2a. In some cases, the multidirectional swipe key may be automatically configured by the specific UI or application being used. In these instances, the multidirectional swipe key need not be user-configurable (e.g., if the multidirectional swipe key is hard coded or is otherwise automatically configured).

Figure 1C:
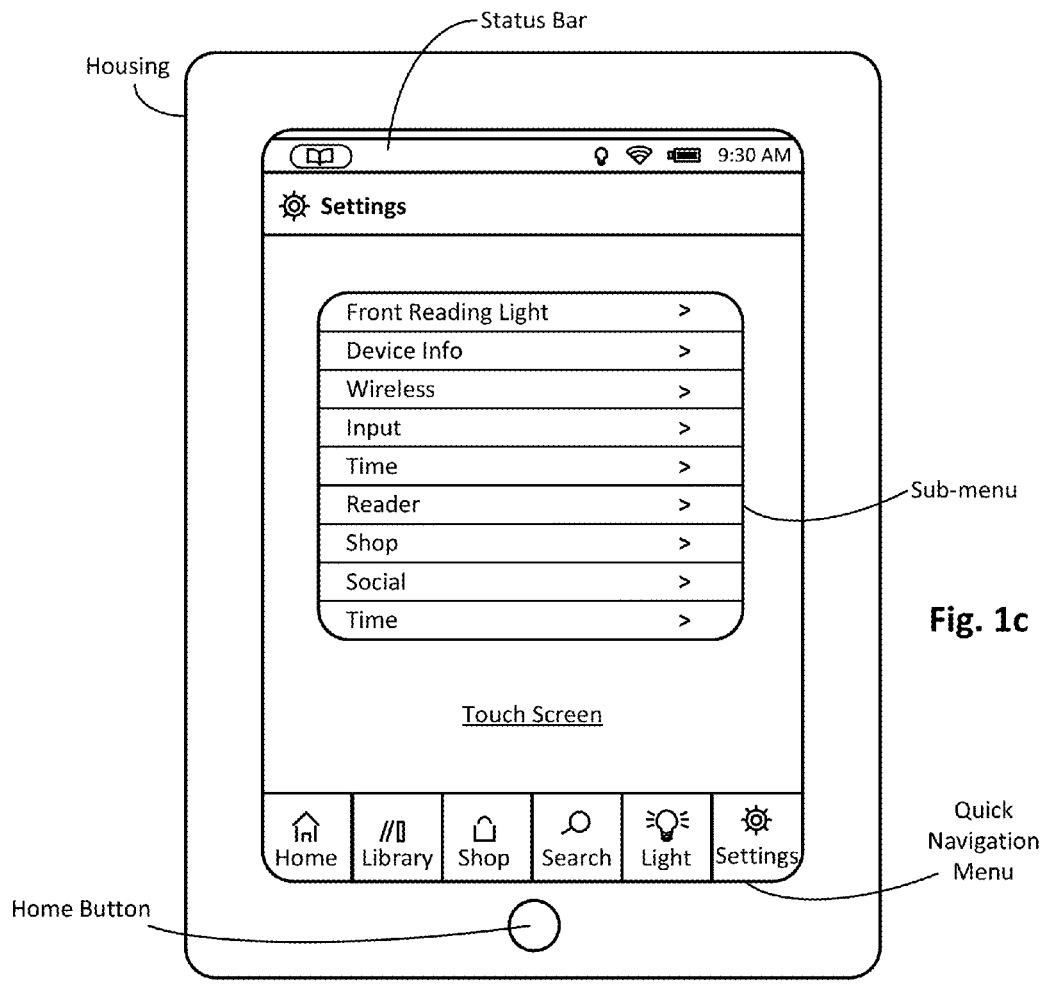
FIGS. 1c-d illustrate example configuration screen shots of the user interface of the touch sensitive computing device shown in FIGS. 1a-b configured in accordance with an embodiment of the present invention.
Figure 1D:
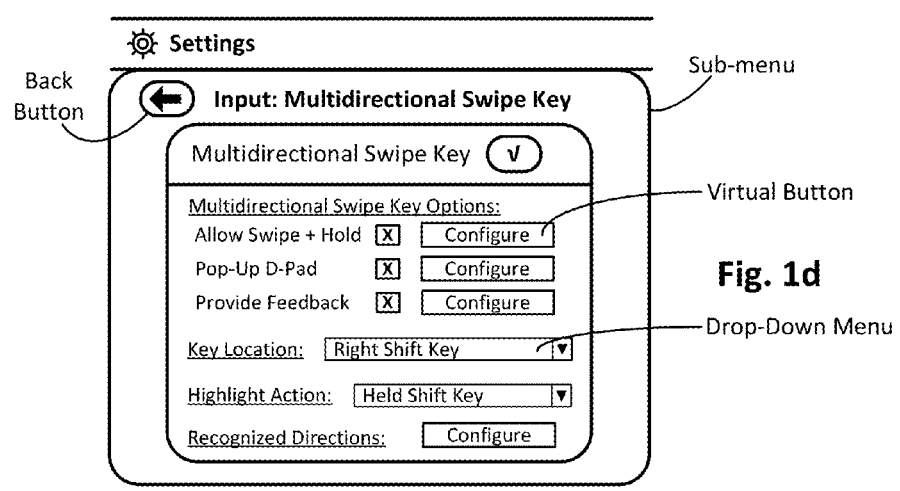

As previously explained, and with further reference to FIGS. 1c and 1d, once the Settings sub-menu is displayed (FIG. 1c), the user can then select the Input option. In response to such a selection, the multidirectional swipe key configuration sub-menu shown in FIG. 1d can be provided to the user. In this example case, the multidirectional swipe key configuration sub-menu includes a UI check box that when checked or otherwise selected by the user, effectively enables the multidirectional swipe key (shown in the enabled state); unchecking the box disables the key. Enabling the multidirectional swipe key may include provisioning the key on the device's virtual keyboard to be used as described herein. When the multidirectional swipe key is disabled, the key may be removed from the virtual keyboard or replaced with a different key (such as a shift key). Other embodiments may have the multidirectional swipe key always enabled, or enabled by a switch or button, for example. In some instances, the multidirectional swipe key may be automatically enabled in response to an action, such as when a text input field becomes active (e.g., tapping into a text entry box) or when a virtual keyboard is displayed. As previously described, the user may be able to configure some of the features with respect to the multidirectional swipe key, so as to effectively give the user a say in when the multidirectional swipe key is available, if so desired.

In the example case shown in FIG. 1d, once the multidirectional swipe key is enabled, the user can select from the Multidirectional Swipe Key Options, which include Allow Swipe+Hold, Pop-Up D-Pad, and Provide Feedback. The Allow Swipe+Hold option allows a user to swipe from the multidirectional swipe key and hold the swipe gesture for continual (or repeated) cursor movement. The Pop-Up D-Pad option causes a directional pad (D-Pad) to pop-up when a user makes contact with the multidirectional swipe key (i.e., when the starting contact point is on the multidirectional swipe key). The Provide Feedback option causes the touch sensitive computing device to provide feedback when a user uses the multidirectional swipe key to cause cursor movement. The feedback may be visual, aural, or haptic. In this example settings screen, all three options are shown in their enabled states and include a Configure virtual button to allow a user to configure additional aspects of the options or features.

Continuing with the example case shown in FIG. 1d, the user can also configure the Key Location, the Highlight Action, and the Recognized Directions from this settings screen. The Key Location setting has a drop-down menu that allows a user to select the location of the multidirectional swipe key on the virtual keyboard. In this example case, the Key Location is set as the Right Shift Key location. Therefore, the location of the multidirectional swipe key on the virtual keyboard may be user-configurable to some extent, or the location may be automatically set or hard-coded. In some instances, the multidirectional swipe key may be placed at or near the center of the virtual keyboard to, for example, provide more horizontal space in both directions for swipe gestures from the key. In some instances, the multidirectional swipe key may be place at or near the top of the virtual keyboard to, for example, provide more vertical space in both directions for swipe gestures from the key. In some example embodiments, the multidirectional swipe key gestures may be made by pressing the multidirectional swipe key while gesturing elsewhere on the touch screen. In some such examples, the user may be able to press down on the multidirectional swipe key with one finger while using the other hand to make the gestures for cursor movement (or directional input) described herein.

The Highlight Action setting has a drop-down menu that allows a user to select the activating action for highlighting and/or selecting text while using the multidirectional swipe key for cursor movement. In this example case, the Highlight Action is set as needing a Held Shift Key to cause text to be highlighted and/or selected in combination with cursor movement. Other options for the Highlight Action may include pre-selection of the shift key or using two contact points (e.g., two fingers) when making swipe gestures on the multidirectional swipe key, for example. The Recognized Directions setting has a Configure virtual button that allows a user to configure which directions are recognized using the multidirectional swipe key. For example, the user may only want swipe gestures to be translated to up, down, left, and right cursor movement (directional input). In another example configuration, the user may want all directions recognized (including diagonals). Numerous configurations and features will be apparent in light of this disclosure.

In other embodiments, the user may specify a number of applications in which the multidirectional swipe key can be invoked (e.g., provisioned on the virtual keyboard). Such a configuration feature may be helpful, for instance, in a tablet or laptop or other multifunction computing device that can execute different applications (as opposed to a device that is more or less dedicated to a particular application). In one example case, for instance, the available applications could be provided along with a corresponding check box. Example diverse applications include an eBook application, a document editing application, a text or chat messaging application, a browser application, a file manager application, a word processor application, a document viewer application, or any application including text based search, to name a few. In other embodiments, the multidirectional swipe key may be invoked (or provisioned on the virtual keyboard) whenever the virtual keyboard application is running or is displayed on the screen, regardless of the application being used. Any number of applications or device functions may benefit from a multidirectional swipe key as provided herein, whether user-configurable or not, and the claimed invention is not intended to be limited to any particular application or set of applications.

As can be further seen, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1c and 1d show user configurability, other embodiments may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme of any kind.

Architecture

Figure 2A:
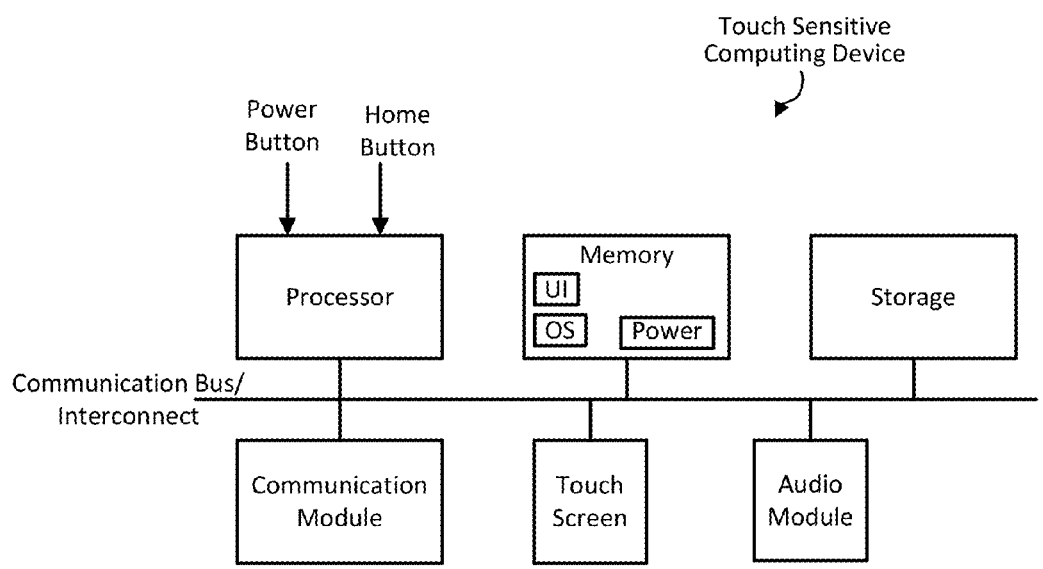
FIG. 2a illustrates a block diagram of a touch sensitive computing device configured in accordance with an embodiment of the present invention.

FIG. 2a illustrates a block diagram of a touch sensitive computing device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). Further note that although a touch screen display is provided, other embodiments may include a non-touch screen and a touch sensitive surface such as a track pad, or a touch sensitive housing configured with one or more acoustic sensors, etc. In any such cases, the touch sensitive surface is generally capable of translating a user's physical contact with the surface (e.g., touching the surface with a finger or an implement, such as a stylus) into an electronic signal that can be manipulated or otherwise used to trigger a specific user interface action, such as those provided herein. The principles provided herein equally apply to any such touch sensitive devices. For ease of description, examples are provided with touch screen technology.

The touch sensitive surface (touch sensitive display in this example) can be any device that is configured with user input detecting technologies, whether capacitive, resistive, acoustic, active or passive stylus, and/or other input detecting technology. The screen display can be layered above input sensors, such as a capacitive sensor grid for passive touch-based input (e.g., with a finger or passive stylus in the case of a so-called in-plane switching (IPS) panel), or an electro-magnetic resonance (EMR) sensor grid (e.g., for sensing a resonant circuit of the stylus). In some embodiments, the touch screen display can be configured with a purely capacitive sensor, while in other embodiments the touch screen display may be configured to provide a hybrid mode that allows for both capacitive input and active stylus input. In still other embodiments, the touch screen display may be configured with only an active stylus sensor. In any such embodiments, a touch screen controller may be configured to selectively scan the touch screen display and/or selectively report contacts detected directly on or otherwise sufficiently proximate to (e.g., within a few centimeters) the touch screen display. Numerous touch screen display configurations can be implemented using any number of known or proprietary screen based input detecting technology.

Continuing with the example embodiment shown in FIG. 2a, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device including a virtual keyboard having a multidirectional swipe key as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments® OMAP3621 applications processor), and may include one or more co-processors or controllers to assist in device control. In this example case, the processor receives input from the user, including input from or otherwise derived from the power button, home button, and touch sensitive surface. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory).

The display can be implemented, for example, with a 6-inch E-ink Pearl 800×600 pixel screen with Neonode® zForce® touch screen, or any other suitable display and touch screen interface technology. The communications module can be, for instance, any suitable 802.11 b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc.). The device may be smaller, for example, for smart phone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms, or other platforms including a virtual keyboard. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology and the various example screen shots shown in FIGS. 1a, 1c-d, and 3a-f, in conjunction with the multidirectional swipe key methodologies demonstrated in FIG. 4, which will be discussed in turn. The audio module can be configured, for example, to speak or otherwise aurally present a selected eBook or other textual content, if preferred by the user. In some example cases, if additional space is desired, for example, to store digital books or other content and media, storage can be expanded via a microSD card or other suitable memory expansion technology (e.g., 32 GBytes, or higher).

Client-Server System

Figure 2B:
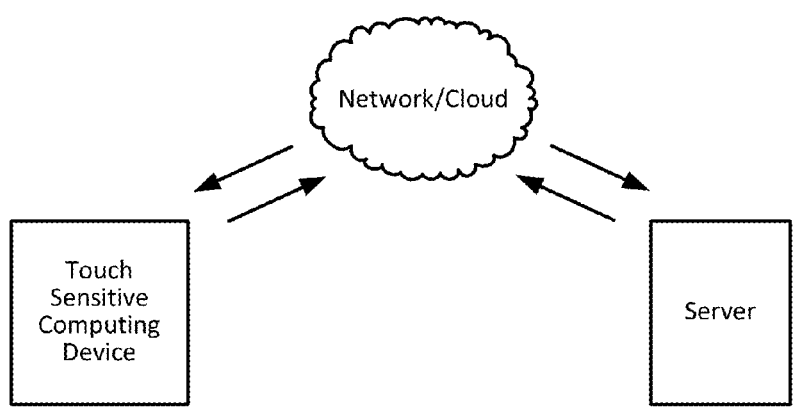
FIG. 2b illustrates a block diagram of a communication system including the touch sensitive computing device of FIG. 2a configured in accordance with an embodiment of the present invention.

FIG. 2b illustrates a block diagram of a communication system including the touch sensitive computing device of FIG. 2a, configured in accordance with an embodiment of the present invention. As can be seen, the system generally includes a touch sensitive computing device that is capable of communicating with a server via a network/cloud. In this example embodiment, the touch sensitive computing device may be, for example, an eReader, a mobile phone, a smart phone, a laptop, a tablet, a desktop computer, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by providing the user with requested or otherwise recommended content. In some such embodiments, the server may be configured to remotely provision a virtual keyboard including a multidirectional swipe key as provided herein to the touch sensitive device (e.g., via JavaScript or other browser based technology). In other embodiments, portions of the methodology may be executed on the server and other portions of the methodology may be executed on the device. Numerous server-side/client-side execution schemes can be implemented to facilitate a multidirectional swipe key in accordance with one or more embodiments, as will be apparent in light of this disclosure.

Multidirectional Swipe Key Gesture Examples

Figure 3A:
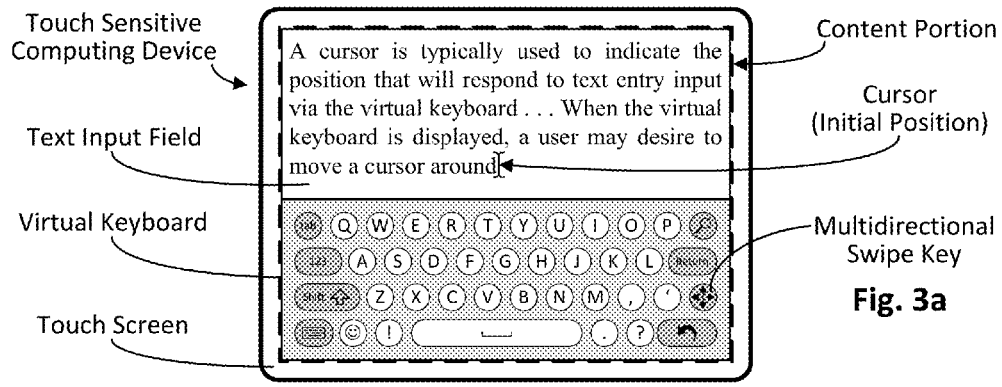

FIGS. 3a-f illustrate gestures for directional input from a multidirectional swipe key of a virtual keyboard on a touch sensitive computing device, in accordance with one or more embodiments of the present invention. As shown in FIG. 3a, the device includes a frame that houses a touch sensitive surface, which in this example, is a touch screen display. In some embodiments, the touch sensitive surface may be separate from the display, such as is the case with a track pad. In this example embodiment, the touch screen display contains a content portion (within the dashed line area). As previously described, any touch sensitive surface for receiving user input (e.g., via direct contact or hovering input) may be used to perform swipe gestures using a multidirectional swipe key for directional input as described herein. The multidirectional swipe key gestures may be made by a user's hand(s) and/or by one or more implements (such as a stylus or pen), for example. The multidirectional swipe key gestures and resulting cursor movements shown in FIGS. 3b-f are provided for illustrative purposes only and are not exhaustive of all possible multidirectional swipe key configurations and features, and are not intended to limit the claimed invention.

FIG. 3a shows a text input field in the upper part of the content portion and a virtual keyboard in the lower part, as may be displayed, for example, in a word processing or messaging application. The text input field may be any field or box that allows the entry of text and/or other characters via a virtual keyboard, for example. A cursor is typically displayed in the text input field when the field is active (such as is the case in this example screen shot) to indicate the position in the field that will receive or otherwise respond to input from the virtual keyboard (or other input mechanisms). In some instances, the virtual keyboard will always be displayed, while in other instances, the virtual keyboard will appear or only be displayed when a text input field becomes active, such as when a user selects the text input field (e.g., with an appropriately positioned tap).

Virtual keyboards including a multidirectional swipe key as disclosed herein may have any layout or configuration, such as the QWERTY keyboard layout as shown in FIG. 3a, a numerical keyboard, a foreign language keyboard, or any other layout including multiple buttons or keys. In some instances, the virtual keyboard may have multiple selectable layouts. Although the virtual keyboard is shown in this example embodiment as a part of the display, in other embodiments, the virtual keyboard may have a different format, such as an optically projected keyboard layout or other optical detection system for keyboard input, for example. A user can interact with the virtual keyboard by making direct or proximate contact with a particular key to select/input that particular key. For example, an appropriately positioned tap (or hover input) on an alpha-numeric key, such as the "H" key, inputs that alpha-numeric (i.e., the letter "H") at the cursor location. Further, selection of non-alphanumeric keys may cause various functions. For example, the shift key is a modifier key that can be used for various functions, such as to change the case of letters (uppercase vs. lowercase) or to cause text to be highlighted and/or selected in combination with cursor movement using the multidirectional swipe key as described herein.

FIG. 3a shows the cursor in the initial cursor position, i.e., the position the cursor is in before performing any of the multidirectional swipe key gesture examples illustrated in FIGS. 3b-f, thereby providing a starting reference point for the resulting cursor positions. Various swipe gestures starting from the multidirectional swipe key may be used to perform cursor movements and/or other directional input, as will be apparent in light of this disclosure. In general, the direction of the swipe gesture can determine the direction of the cursor movement. Other various characteristics of the multidirectional swipe key gesture may also affect the cursor movement. In some example cases, the length of the swipe gesture may affect the cursor movement. For example, a longer swipe may result in increased or faster cursor movement. In some example cases, the speed of the swipe gesture may affect the cursor movement. For example, faster swipes may result in increased or faster cursor movement. In some example cases, the number of contact points used when swiping may affect the cursor movement. For example, using more contact points (e.g., more fingers) when swiping may result in increased or faster cursor movement. Other various characteristics of multidirectional swipe key gestures may affect cursor movement, as will be apparent in light of this disclosure.

Figure 3B:
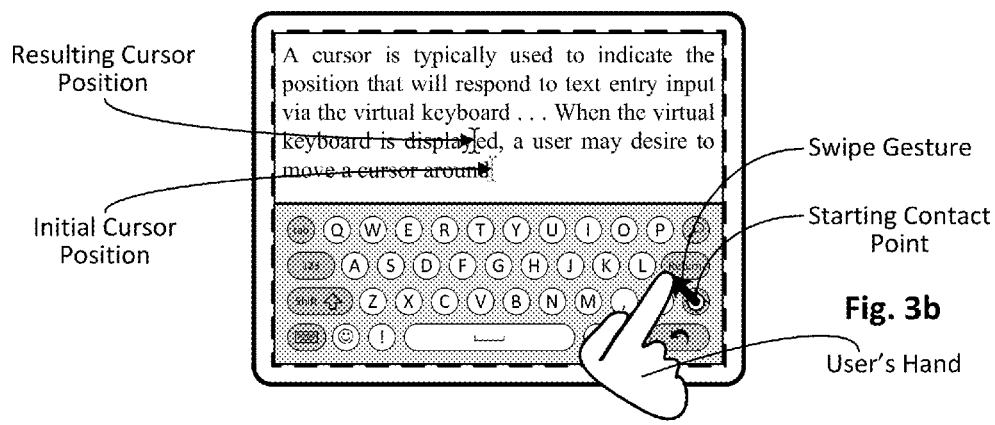

FIG. 3b shows an example swipe gesture from the multidirectional swipe key for cursor movement, in accordance with an embodiment of the present invention. More specifically, a diagonal swipe gesture was performed to cause the cursor to move diagonally from the initial position shown in FIG. 3a. In the example case shown in FIG. 3b, the swipe gesture is being made by a user's hand (specifically one finger since only one contact point is being used). As previously described, the swipe gesture could be made in other ways, such as by using a mouse, stylus, or other suitable input technique. The swipe gesture shown in FIG. 3b may alternatively be referred to or understood as a swipe and release gesture, particularly in light of the swipe and hold gestures described herein. The swipe gesture has a starting contact point which is designated with a circle for purposes of illustration. The starting contact point(s) and/or path of the swipe gesture may be indicated on the display of the touch sensitive computing device to provide visual feedback, in accordance with an example embodiment. The swipe gesture is released at the end of In other example embodiments, other feedback may be provided, such as aural or haptic, depending upon the configuration of the multidirectional swipe key.

As previously described, the cursor movement can be determined by at least the direction of the swipe gesture. The swipe gesture is made by initiating contact on the multidirectional swipe key and maintaining the contact while swiping in a certain direction to cause the desired cursor movement. In some instances, the multidirectional swipe key may have to, for example, be held (e.g., for 1-2 seconds, or some other suitable duration) prior to swiping for cursor movement (or directional input). The swipe gesture may cause the cursor to move in various ways depending on the configuration of the multidirectional swipe key. For example, in one case, the swipe gesture may perform one instance of cursor movement based on the characteristics of the gesture (e.g., based on the length and/or speed of the swipe gesture). In some such cases, the cursor may move after the gesture is released, for example the cursor may move one word at a time (e.g., when horizontal swipe gestures are made) or one line at a time (e.g., when vertical swipe gestures are made). In another example case, the swipe gesture may perform continual (or repeated) cursor movement when the swipe gesture is held. In some such cases, the user may be able to move relative to the starting contact point to cause continual cursor movement in different directions while maintaining contact (direct or proximate) with the touch sensitive surface, for example. In another example case, the cursor movement may track the swipe gesture, such that after the starting contact point is made on the multidirectional swipe key, the cursor moves with the swipe gesture.

Figure 3C:
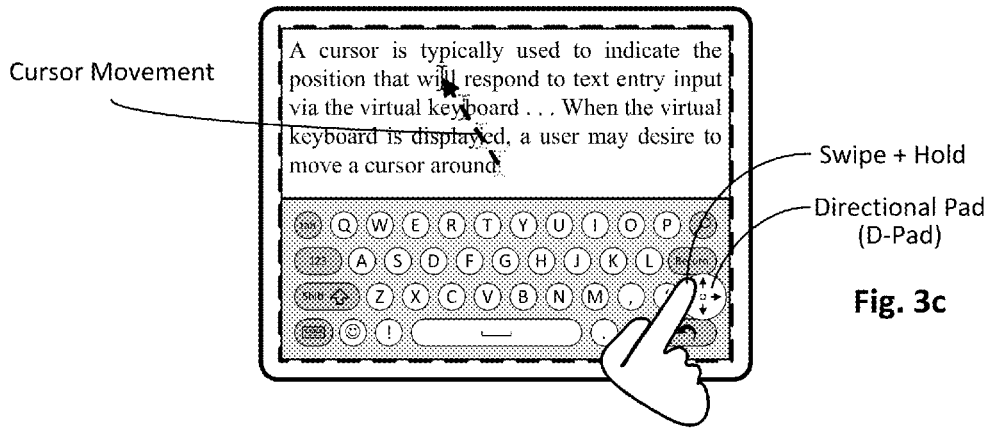

FIG. 3c shows an example swipe and hold gesture from the multidirectional swipe key for cursor movement, in accordance with an embodiment. In this embodiment, the multidirectional swipe key is configured with a directional pad (D-pad) pop-up. In some cases, the D-pad may be displayed after making initial contact with the multidirectional swipe key. In other cases, the D-pad may be displayed after holding the starting contact point on the multidirectional key for a preset duration (e.g., for 1-2 seconds, or some other suitable duration). In other cases, the D-pad may be displayed after tapping on the multidirectional swipe key, allowing for directional input using swipe gestures as described herein. In some such cases, the D-pad may be hidden by, for example, tapping elsewhere on the virtual keyboard. When the D-pad pop-up is displayed, cursor movement (or directional input) may be determined relative to the center of the D-pad. The center of the D-pad may be located at the starting contact point with the multidirectional swipe key or the center of the multidirectional swipe key, for example.

In the example case shown in FIG. 3c, a diagonal swipe and hold gesture was performed to cause the cursor to move diagonally from the initial position shown in FIG. 3a. In this example case, holding the swipe gesture causes continual cursor movement in the direction indicated by the swipe gesture (i.e., diagonally up and left as shown). The continual cursor movement is indicated by the arrow in the text box for illustrative purposes. In this example case, the swipe gesture is not visually indicated on the touch screen, since the direction of cursor movement (or directional input) can be determined using the D-pad. In some instances, the D-pad may disappear or be hidden after the user releases contact (whether direct or proximate) after making the swipe gesture. In other instances, the D-pad pop-up may continue to be displayed until another action is performed, such as tapping elsewhere on the touch screen, for example.

FIGS. 3d-d''' show an example multidirectional swipe key gesture made while maintaining contact for cursor movement in multiple directions and at multiple speeds, in accordance with an embodiment. In this embodiment, the D-pad pop-up is displayed after making initial contact with the multidirectional swipe key and centered on the starting contact point made with the multidirectional swipe key, as shown. As previously described, configuration of the multidirectional swipe key may affect how the swipe gesture is translated to directional input. In the example case shown in FIGS. 3d-d''', the multidirectional swipe key is configured to translate swipe gestures relative to the center of the D-pad pop-up (i.e., the starting contact point made with the multidirectional swipe key, in this example case).

FIG. 3d shows a swipe and hold in a first direction (i.e., an up-right diagonal direction) at a first length to cause continual cursor movement at a first speed from the initial position shown in FIG. 3a. FIG. 3d' shows a drag of the gesture to a second direction (i.e., a leftward direction) while maintaining contact to cause continual cursor movement in that second direction from the resulting position shown in FIG. 3d'''. In some cases, the cursor movement (or directional input) may continually occur based on the direction of the gesture (relative to the center of the D-Pad, in this example case) while the user is dragging the gesture. In other cases, to drag from the first position shown in FIG. 3d to the second position shown in FIG. 3d', the user may have to swipe back to the center of the D-pad to stop cursor movement before swiping in another (or the same) direction. In other cases, cursor movement (or directional input) may not occur until the user has stopped dragging (while continuing to hold the gesture). Therefore, in some such cases, unwanted cursor movement (or directional input) may be ignored while the user is dragging to the second direction. FIG. 3d' also illustrates that the multidirectional swipe key gestures for cursor movement (or directional input) described herein do not require that the entire swipe gesture be performed within any certain part of the touch screen display, as long as they are started from the multidirectional swipe key (or gestures are made in combination with a multidirectional swipe key press, as previously described). For example, as shown in FIG. 3d', the swipe gesture extends beyond the bounds of the D-pad pop-up display, but the gesture is still registered (since the starting contact point was made on the multidirectional swipe key).

As previously described, the multidirectional swipe key gesture characteristics can affect the cursor movement (or directional input). For example, the length of the swipe (relative to the center of the D-pad) in the example multidirectional swipe key gesture shown in FIGS. 3d-d''' affects the speed of the cursor movement. The swipe in FIG. 3d has a first length, causing continual cursor movement at a first speed. The swipe in FIG. 3d' has a second length greater than the first length, causing continual cursor movement at a second speed greater than the first speed. FIG. 3d''' shows a drag of the gesture shown in FIG. 3d' to cause continual cursor movement (in the same direction) at a third speed from the resulting position shown in FIG. 3d'. As can be seen, the third length is greater than the second length resulting in a cursor movement speed greater than the second speed. Therefore, dragging farther away from the center of the D-pad pop-up display causes acceleration of the cursor movement. Various other characteristics of gestures made starting from the multidirectional swipe key may affect the resulting cursor movement (or directional input) based on the configuration of the multidirectional swipe key, as will be apparent in light of this disclosure.

FIGS. 3e-e' show an example multidirectional swipe key gesture made while maintaining contact to cause cursor movement that tracks the gesture movement, in accordance with an embodiment. As shown in FIG. 3e, in this example embodiment, the cursor moved leftward from its initial position (shown in FIG. 3a) to the resulting position based on the leftward swipe shown. Since the cursor is tracking the movement of the gesture, the cursor moved as far left as the gesture. FIG. 3e' shows a continuation of the gesture, i.e., while contact (whether direct or proximate) is maintained, in an upward motion to cause the cursor to move from the resulting position shown in FIG. 3e to the resulting position shown in FIG. 3e'. The cursor movement (or directional input) may be affected by the characteristics of the multidirectional swipe key gesture when configured with tracking. For example, an increased number of contact points (e.g., more fingers used when making the gesture) may cause the cursor to move a greater distance.

FIG. 3f shows an example highlighting action in use with a multidirectional swipe key gesture, in accordance with an embodiment. In this example case, the shift key is being held down (by the user's other hand) while making a swipe gesture from the multidirectional swipe key to cause the text to be highlighted and/or selected in combination with the cursor movement shown (from the initial cursor position in FIG. 3a). As previously described, the highlight activation action may include various actions such as selecting the shift key/function before performing multidirectional swipe key gestures for cursor movement, for example. Therefore, when using the highlighting feature, the multidirectional swipe key gesture causes cursor movement as described herein, but also performs the additional function of highlighting and/or selecting text as the cursor moves. In some embodiments, other actions or functions may be used in combination with the multidirectional swipe key gestures as variously described herein. For example, in one embodiment, multidirectional swipe key gestures may be used in combination with a copy key to copy selected text. In some such embodiments, the user may hold down the copy key, move the cursor and select text using the multidirectional swipe key, and release the copy key to copy the selected text. These example actions and functions are provided for illustrative purposes and are not intended to limit the claimed invention.

As previously described, in some embodiments, the swipe gesture techniques provided herein for cursor movement may also be used to perform more general arrow key functions or directional input. The virtual keyboard is generally displayed when there is an active input field (e.g., an active text box) allowing for input from that virtual keyboard. However, in some cases, the virtual keyboard may be displayed in other situations (i.e., it may be displayed when no input field is displayed or active), such as if the user selects to always display the virtual keyboard or continually displayed the virtual keyboard in a specific application, for example. In some such situations, the multidirectional swipe key gestures used for cursor movement described herein may be used for more general directional input. For example, in a spreadsheet application, the multidirectional swipe key gestures may be used to navigate cells within the spreadsheet document when a cell is selected but not active. In another example situation, when an object or graphic is selected (and no input fields are active), the gesture techniques may be used to subsequently move that selected object/graphic. In some such example embodiments, the same swipe gesture configurations and/or features for cursor movement may be used instead for general directional input (e.g., to move the selected object/graphic in this example case). Numerous different multidirectional swipe key gestures and configurations will be apparent in light of this disclosure.

Methodology

Figure 4:
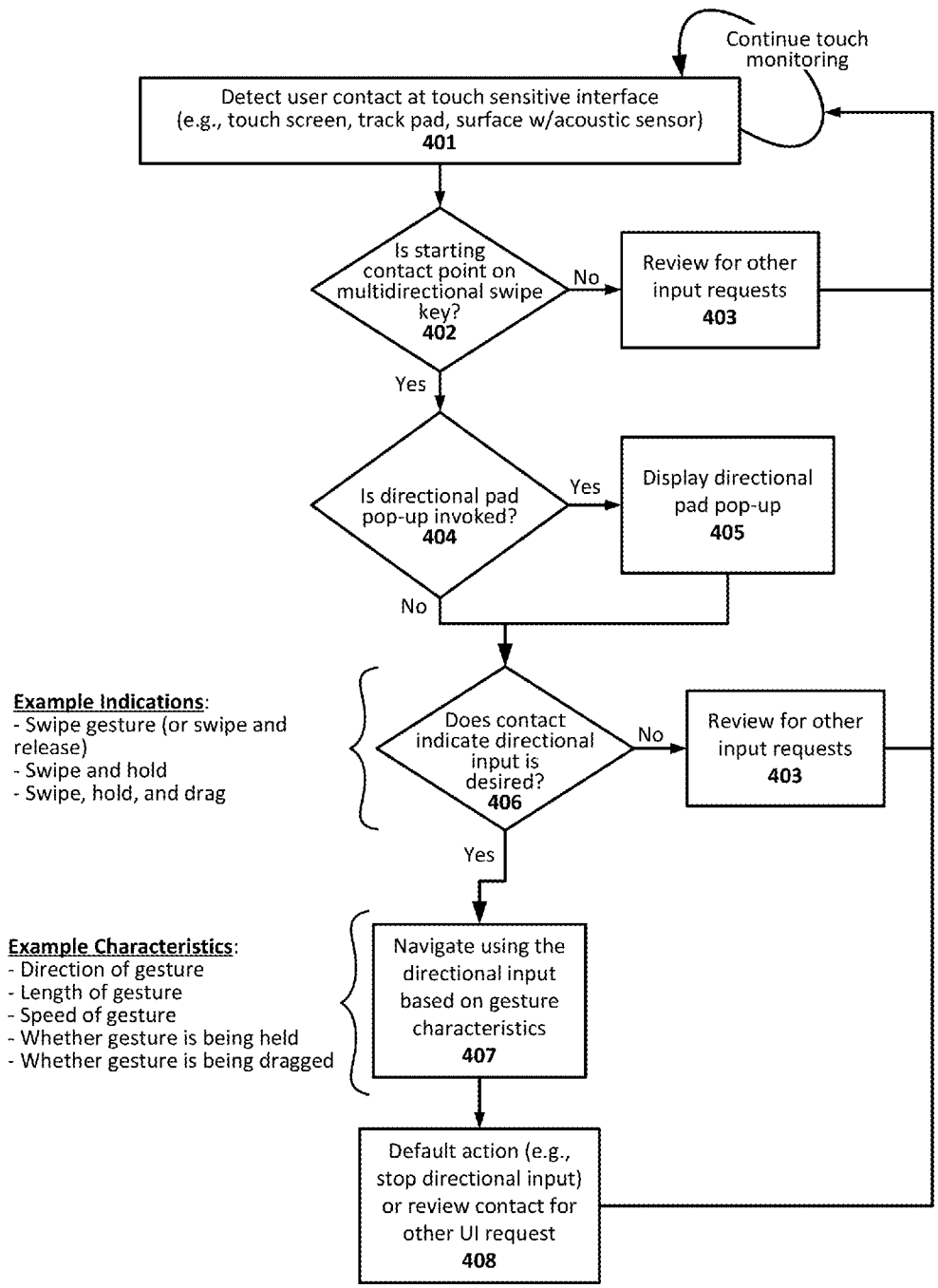
FIG. 4 illustrates a method for using a multidirectional swipe key of a virtual keyboard for directional input, in accordance with an embodiment of the present invention.

FIG. 4 illustrates a method for using a multidirectional swipe key of a virtual keyboard for directional input, in accordance with an embodiment of the present invention. This example methodology may be implemented, for instance, by the UI module of the touch sensitive device shown in FIG. 2a, or the touch sensitive device shown in FIG. 2b (e.g., with the UI provisioned to the client by the server). To this end, the UI can be implemented in software, hardware, firmware, or any combination thereof, as will be appreciated in light of this disclosure.

As can be seen, the method generally includes sensing a user's input by a touch sensitive surface. In general, any touch sensitive device may be used to detect contact with it by one or more fingers and/or styluses or other suitable implements. Since contact is location specific relative to the displayed content, the UI can detect whether the contact starts and continues on a displayed virtual keyboard. As soon as the user begins to drag or otherwise move the contact point (i.e., starting contact point), the UI code (and/or hardware) can assume a swipe gesture has been engaged and track the path of each contact point with respect to any fixed point within the touch surface until the user stops engaging the touch sensitive surface. The release point can also be captured by the UI as it may be used to execute or stop executing (e.g., in the case of holding for continual directional input) the action started when the user pressed on the touch sensitive surface. These main detections can be used in various ways to implement UI functionality, including a virtual keyboard having a multidirectional swipe key as variously described herein, as will be appreciated in light of this disclosure.

In this example case, the method includes detecting 401 user contact at the touch sensitive interface. In general, the touch monitoring is effectively continuous. The method continues with determining 402 if the starting contact point is on the multidirectional swipe key of the virtual keyboard. This may include an initial step of determining whether a virtual keyboard is being displayed. If a virtual keyboard is not displayed or user contact does not start on the multidirectional swipe key of the virtual keyboard, then the method may continue with reviewing 403 the contact for some other UI request (e.g., select a file, send an email, etc.). If a virtual keyboard is displayed and the starting contact point is on the multidirectional swipe key of the virtual keyboard, the method continues by determining 404 if the directional pad pop-up is invoked. This step may include an initial step of determining if the directional pad pop-up feature is enabled. If the directional pad pop-up is invoked, in some cases, the directional pad pop-up may be displayed 405 after the starting contact point has been made on the multidirectional swipe key. In other cases, the starting contact point may have to be held for a preset duration (e.g., 1-2 seconds or other suitable duration) to display the directional pad pop-up 405.

The method continues by determining 406 if the contact indicates that directional input is desired, regardless of whether the directional pad pop-up has been invoked. Example indications that directional input is desired may include: a swipe (or swipe and release) gesture made in a desired direction; a swipe and hold gesture made in one or more desired directions; or a swipe, hold, and drag gesture made in one or more desired directions, depending upon the configuration of the multidirectional swipe key. If the contact does not indicate that directional input is desired using the multidirectional swipe key, then the method may continue with reviewing 403 the contact for some other UI or input requests. If the contact does indicate that directional input is desired using the multidirectional swipe key, then the method continues by navigating 407 using the directional input based on the gesture characteristics. In other words, the directional input is entered to cause, for example, cursor movement. Example gesture characteristics that may affect the directional input may include: the direction, length, and/or speed of the gesture; whether the gesture is being held; and/or whether the gesture is being dragged. Recall that the multidirectional swipe key may be configured by the user to a given extent, in some embodiments. Other embodiments, however, may be hard-coded or otherwise configured to carry out certain specific actions without allowing for user-configuration, as will be further appreciated in light of this disclosure.

After the directional input has been entered in response to the swipe gesture(s) made, the method continues with a default action 408, such as stopping the directional input or doing nothing until further user contact/input is received. Likewise, the received contact can be reviewed for some other UI request, as done at 403. The method may continue in the touch monitoring mode indefinitely or as otherwise desired, so that any contact provided by the user can be evaluated, e.g., to determine whether the contact was started on the multidirectional swipe key and to follow the example methodology shown in FIG. 4. As previously indicated, the multidirectional swipe key may be configured to stop directional input by, for example, the user releasing the ending contact point or pressing a release mode UI feature such as the home button or a touch screen feature. In instances where the multidirectional swipe key is separate from the virtual keyboard (e.g., a separate application that provisions the multidirectional swipe key onto an already existing virtual keyboard), the multidirectional swipe key may be tied to the virtual keyboard such that it will only be available when the virtual keyboard is displayed. In this instance, power and/or memory may be conserved since the multidirectional swipe key will only be displayed or otherwise be available when the virtual keyboard is displayed.

Numerous variations and embodiments will be apparent in light of this disclosure. One example embodiment of the present invention provides a device including a display for displaying content to a user, a touch sensitive surface for allowing user input, and a user interface including a virtual keyboard. The virtual keyboard includes a multidirectional swipe key, wherein a swipe gesture started on the multidirectional swipe key causes directional input determined by the direction of the swipe gesture. In some cases, the display is a touch screen display that includes the touch sensitive surface. In some cases, the directional input is based on at least one of the swipe gesture length, swipe gesture speed, whether the swipe gesture is held, and whether the swipe gesture is dragged. In some cases, a directional pad pop-up is displayed after making contact with the multidirectional swipe key or after a press-and-hold on the multidirectional swipe key for a predetermined duration. In some such cases, the directional pad pop-up continues to be displayed and allow for additional swipe gestures for additional directional input until the directional pad pop-up display is exited. In some cases, the direction of the swipe gesture is relative to the starting contact point with the multidirectional swipe key. In some such cases, dragging the swipe gesture farther away from the starting contact point accelerates directional input. In some cases, the directional input is cursor movement which tracks the direction of the swipe gesture. In some cases, the swipe gesture is translated into upward, rightward, downward, and/or leftward directional input. In some cases, the device is a smart phone, eReader, or tablet computer. In some cases, the multidirectional swipe key is user-configurable.

Another example embodiment of the present invention provides a mobile computing device including a display having a touch screen interface and for displaying content to a user, and a user interface including a virtual keyboard having a multidirectional swipe key. The multidirectional swipe key is configured to cause cursor movement determined by the direction of a swipe gesture started on the multidirectional swipe key, wherein holding the swipe gesture causes continual cursor movement. In some cases, dragging the swipe gesture farther away from the starting contact point made with the multidirectional swipe key accelerates the continual cursor movement. In some cases, a highlight activation action used in combination with the swipe gesture causes highlighting in combination with the cursor movement. In some cases, the swipe gesture is translated into upward, rightward, downward, and/or leftward cursor movement.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to display a multidirectional swipe key, determine a desired directional input in response to user input via the multidirectional swipe key (wherein the user input includes a swipe gesture started from the multidirectional swipe key to indicate the desired directional input), and navigate in accordance with the desired directional input. In some cases, holding the gesture causes continual directional input in the direction indicated by the swipe gesture. In some such cases, dragging the swipe gesture farther away from the starting contact point made with the multidirectional swipe key accelerates the directional input. In some cases, the directional input tracks the direction of the swipe gesture. In some cases, a directional pad pop-up is displayed after making contact with the multidirectional swipe key or after a press-and-hold on the multidirectional swipe key for a predetermined duration.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
a display for displaying content to a user;
a touch sensitive surface for allowing user input; and
a user interface including a virtual keyboard, the virtual keyboard including a multidirectional swipe key, wherein a swipe gesture started on the multi-directional swipe key causes directional input that tracks a direction of the swipe gesture while the gesture is maintained, and wherein the user interface is configured to allow a number of simultaneous contact points used for the swipe gesture to be increased while the gesture is maintained;
wherein tracking the direction of the swipe gesture while the gesture is maintained includes causing directional input in a first direction in response to swiping in the first direction and causing directional input in a second direction different from the first direction in response to swiping in the second direction, and wherein increasing the number of simultaneous contact points used for the swipe gesture increases at least one of a distance and quantity of directional input.

2. The device of claim 1 wherein swiping in any number of subsequent directions while the gesture is maintained causes further directional input respectively in those subsequent directions.

3. The device of claim 1 wherein the directional input is based on at least one of the swipe gesture length, swipe gesture speed, whether the swipe gesture is held, and whether the swipe gesture is dragged.

4. The device of claim 1 wherein a directional pad pop-up is displayed after making contact with the multidirectional swipe key or after a press-and-hold on the multidirectional swipe key for a predetermined duration.

5. The device of claim 4 wherein the directional pad pop-up continues to be displayed and allow for additional swipe gestures for additional directional input until the directional pad pop-up display is exited.

6. The device of claim 1 wherein before the gesture is released and in response to the swiping being stopped, no additional directional input is caused until the swiping is continued.

7. The device of claim 1 wherein the directional input causes corresponding directional cursor movement.

8. The device of claim 1 wherein the swipe gesture is translated into upward, rightward, downward, and/or leftward directional input.

9. The device of claim 1 wherein the directional input distance and direction is at least approximately equal to the swipe gesture distance and direction.

10. The device of claim 1 wherein the multidirectional swipe key is user-configurable.

11. A mobile computing device, comprising:
a display having a touch screen interface and for displaying content to a user; and
a user interface including a virtual keyboard having a multidirectional swipe key that is configured to cause cursor movement determined by a direction of a swipe gesture started on the multidirectional swipe key,
wherein maintaining the swipe gesture causes cursor movement that tracks the direction of the swipe gesture until the gesture is released, and wherein the user interface is configured to allow a number of simultaneous contact points used for the swipe gesture to be increased while the gesture is maintained;
wherein tracking the direction of the swipe gesture while the gesture is maintained includes causing cursor movement in a first direction in response to swiping in the first direction and causing cursor movement in a second direction different from the first direction in response to swiping in the second direction, and wherein increasing the number of simultaneous contact points used for the swipe gesture increases a distance of cursor movement.

12. The device of claim 11 wherein swiping in any number of subsequent directions while the gesture is maintained causes further cursor movement respectively in those subsequent directions.

13. The device of claim 11 wherein a highlight activation action used in combination with the swipe gesture causes highlighting in combination with the cursor movement.

14. The device of claim 11 wherein the swipe gesture is translated into only one of upward, rightward, downward, and leftward cursor movement.

15. A non-transitory computer program product comprising a plurality of instructions that when executed by a processor of an electronic device, causes a process to be carried out, the process comprising:
display a multidirectional swipe key;
in response to user input via the multidirectional swipe key, determine a desired directional input, wherein the user input includes a swipe gesture started from the multidirectional swipe key to indicate the desired directional input, the directional input configured to track a direction of the swipe gesture while the gesture is maintained, allow a number of simultaneous contact points used for the swipe gesture to be increased while the gesture is maintained, wherein tracking the direction of the swipe gesture while the gesture is maintained includes causing directional input in a first direction in response to swiping in the first direction and causing directional input in a second direction different from the first direction in response to swiping in the second direction and wherein increasing a number of simultaneous contact points used for the swipe gesture increases at least one of a distance and quantity of directional input; and
navigate in accordance with the desired directional input.

16. The computer program product of claim 15 wherein before the gesture is released and in response to the swiping being stopped, no additional directional input is caused until the swiping is continued.

17. The computer program product of claim 15 wherein the directional input causes corresponding directional cursor movement.

18. The computer program product of claim 15 wherein a directional pad pop-up is displayed after making contact with the multidirectional swipe key or after a press-and-hold on the multidirectional swipe key for a predetermined duration.

* * * * *